United States Patent [19]

Hansen et al.

[11] Patent Number: 5,055,862
[45] Date of Patent: Oct. 8, 1991

[54] FILM GHOST REMOVAL IN ELECTROGRAPHIC PLOTTERS BY VOLTAGE BIAS OF THE PLOTTER FOUNTAIN OR FILM EDGE-STRIP

[75] Inventors: Lorin K. Hansen, Fremont; Richard J. Gable, Mountain View; Edwardo D. Lara, Sacramento; William A. Lloyd, Los Altos; Keith E. McFarland, Woodside; Jack H. Sayre, San Jose; Stephen D. White, Santa Clara, all of Calif.

[73] Assignee: Xerox Corporation, Stamford, Conn.

[21] Appl. No.: 454,086

[22] Filed: Dec. 20, 1989

[51] Int. Cl.$^5$ ............................................ G01D 15/06
[52] U.S. Cl. ................................. 346/154; 346/153.1
[58] Field of Search ...................... 346/153.1, 154, 155; 361/214

[56] References Cited

U.S. PATENT DOCUMENTS

| | | | |
|---|---|---|---|
| 4,290,076 | 9/1981 | McFarland | 346/154 |
| 4,366,491 | 12/1982 | Ohnishi et al. | 346/153.1 X |
| 4,994,861 | 2/1991 | Brandon et al. | 355/274 |
| 5,003,327 | 3/1991 | Theodoulou et al. | 346/154 |

Primary Examiner—Benjamin R. Fuller
Assistant Examiner—Randy W. Gibson
Attorney, Agent, or Firm—Townsend and Townsend

[57] ABSTRACT

A preferred embodiment of the present invention is directed to a removal of a ghost image created during a processing of a film laminate medium by an electrographic plotter. A recording of an image on the film medium induces a ghosting potential over a developing station. The ghosting potential causes a spurious image to be developed by the developing station.

The recorded image is created by depositing a charge on a dielectric layer of the film. A relationship exists between the deposited charge and the ghosting potential. By use of information known to the system, the ghosting potential may be estimated and reduced. A preferred method estimates the magnitude of the ghosting potential by use of the relationship between deposited charge and ghosting potential. A counteracting potential is applied to the system to reduce the ghosting potential over the developing station. The reduction of the ghosting potential substantially removes the ghost image created during the processing of the film laminate.

21 Claims, 5 Drawing Sheets

FILM GHOST REMOVAL IN ELECTROGRAPHIC PLOTTERS BY VOLTAGE BIAS OF THE PLOTTER FOUNTAIN OR FILM EDGE-STRIP

BACKGROUND OF THE INVENTION

The present invention generally relates to an improved electrographic plotter and method for improving the performance of electrographic plotters. More specifically, the present invention relates to a method and apparatus to prevent fountain image ghosting on FIGURE plots written on film medium.

Figure 6:
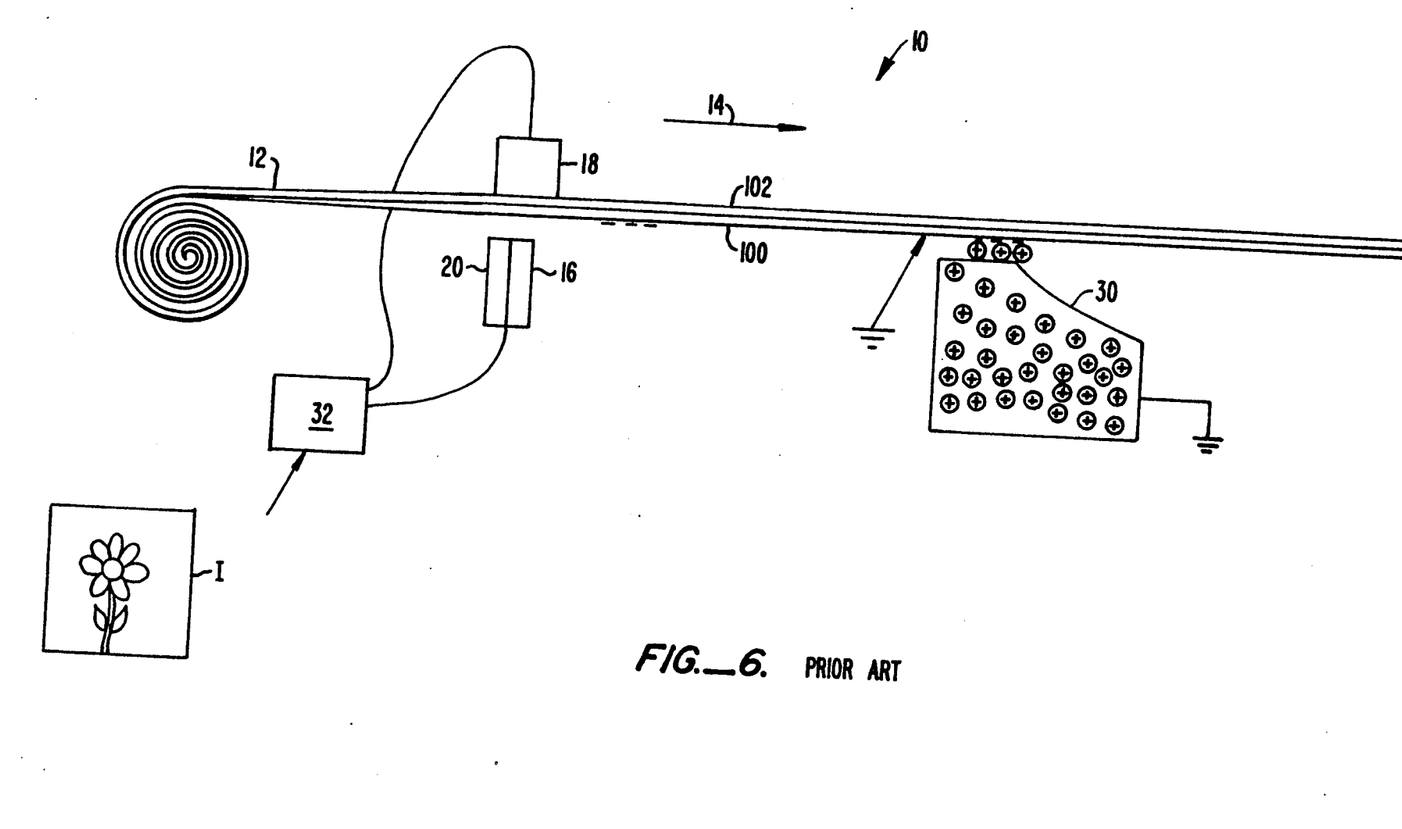
FIG. 6 is a schematic illustration of the operation of an electrographic plotter 10.

Electrographic plotters are known in the prior art, and FIG. 6 is a schematic illustration of the operation of an electrographic plotter 10. Plotter 10 typically has a spiral wound roll of a recording medium 12. Recording medium 12 is taken off the roll and passed in the direction of arrow 14 between a recording head 16 and a plurality of backplate electrodes 18. Recording head 16 includes a plurality of nibs 20 which, in conjunction with backplate electrodes 18, comprise a means for depositing charged particles onto recording medium 12 in a desired pattern. In the particular embodiment described, negatively charged particles are deposited. The pattern of deposited charges is referred to as a latent image. Recording medium 12 is next taken past a developing station 30, also called a fountain, which contains charged particles of a polarity opposite to the deposited particles.

In operation, an image I to be plotted is coded as a digital signal (sequence of 1's and 0's) and sent to a driver circuit 32. Driving circuit 32 operates to control recording head 16 and backplate electrodes 18 to establish an electric potential across recording medium 12. The potential is established by pulsing selected nibs 20 of recording head 16 in a desired pattern as medium 12 passes along the recording station. The typical voltage level between nibs 20 and backplate electrodes 18 for recording an image is 500–600 volts. This causes an electrical discharge. The image itself deposited by the nib-to-media discharge is 100–200 volts. Thus, as selected nibs 20 are pulsed, a latent electrostatic image of image I is deposited on the underside of medium 12 as medium 12 moves toward fountain 30. Recording medium 12 generally comprises two coatings on a substrate, a dielectric material 100 and a conductive material 102. Dielectric material 100 is oriented on the underside for this particular plotter 10. The latent image is subsequently developed at fountain 30 by any of numerous well known processes wherein pigment particles are positively charged and are brought into contact with the negatively charged latent image and processed. Thus, the latent image is developed and made visible.

To facilitate an understanding of the operation of plotter 10, a brief discussion of the mechanism of pulsing nibs 20 will be made. A latent image is composed of a series of "pixels" (picture elements) arranged across the width of a scan, generally 100–400 pixels per inch. The pixels are deposited in well known fashion by pulsing particular ones of nibs 20. To ensure that solid filling and continuous lines are possible, the areas where successive pixels would write must overlap. To provide for this overlap, nibs 20 are usually constructed in two rows. If nibs were numbered sequentially, there would be a row of the odd-numbered nibs and a row of the even-numbered nibs displaced from that. Images from these rows are recorded in an interleaved manner, as is well known.

Figure 8:
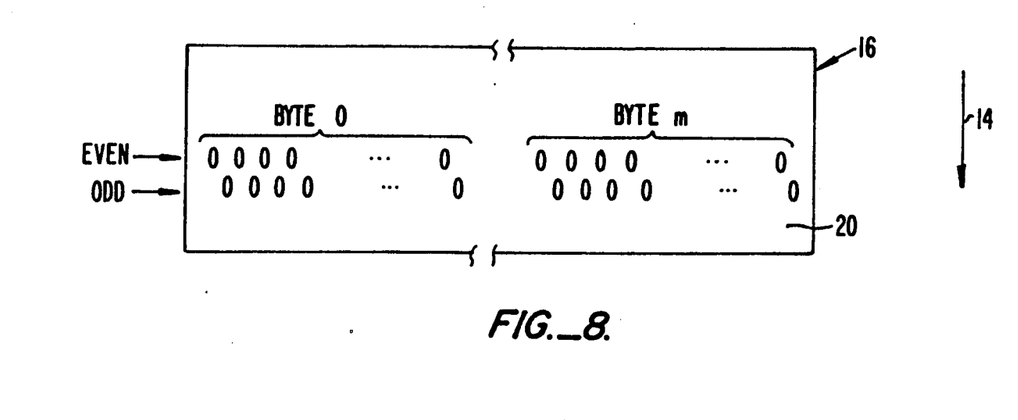
FIG. 8 is a perspective representation of nibs 20 arranged in recording head 16.

FIG. 8 is a perspective representation of nibs 20 arranged in recording head 16. Logically, the nibs are arranged to be serially pulsed, with odd pixels recorded by a first row and even pixels recorded after a short delay when the second row of nibs is over the line of pixels written by the first (odd) row.

Nibs 20 along the head are in groups wired in parallel. By use of well-known multiplexing techniques, one successive group of nibs after another along the head is written until a full line, or "scan", is written by each of the odd and even rows.

Recording medium 12 is a special electrographic paper, film, or other material. For electrographic paper, a base paper 102 is impregnated with a solution to make it conductive. This is then coated with a dielectric layer 100.

Figures 1, 2:
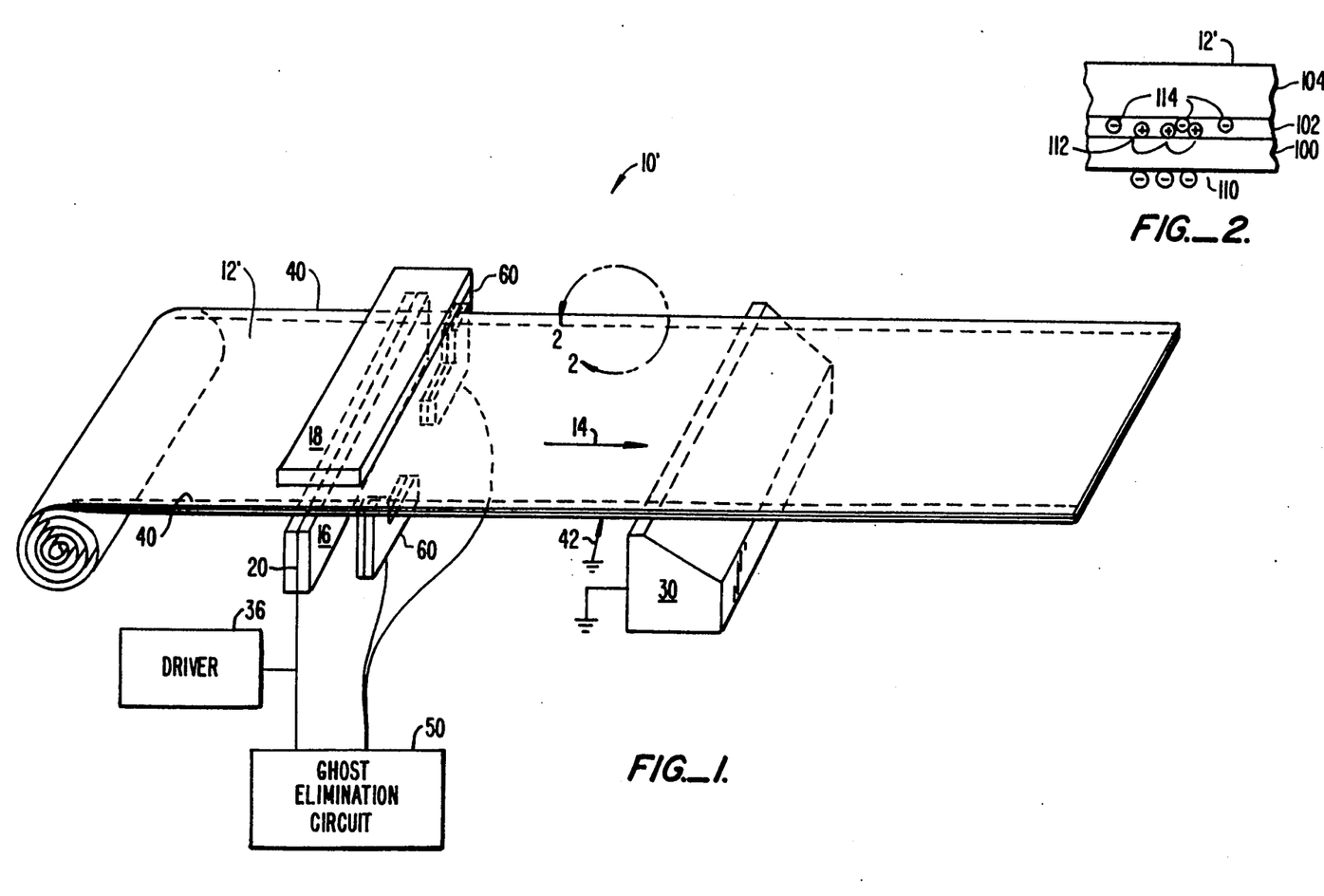
FIG. 1 is a perspective view of an electrographic plotter 10' embodying the present invention and illustrating a preferred embodiment.
FIG. 2 illustrates a cross-sectional view of recording medium 12' which is a film medium.

Also used in plotters is an electrographic film medium. FIG. 2 illustrates a cross-sectional view of recording medium 12' which is a film medium. Film media is comprised of three layers. A film layer 104, a conductive layer 102, and a dielectric layer 100.

Figure 4:
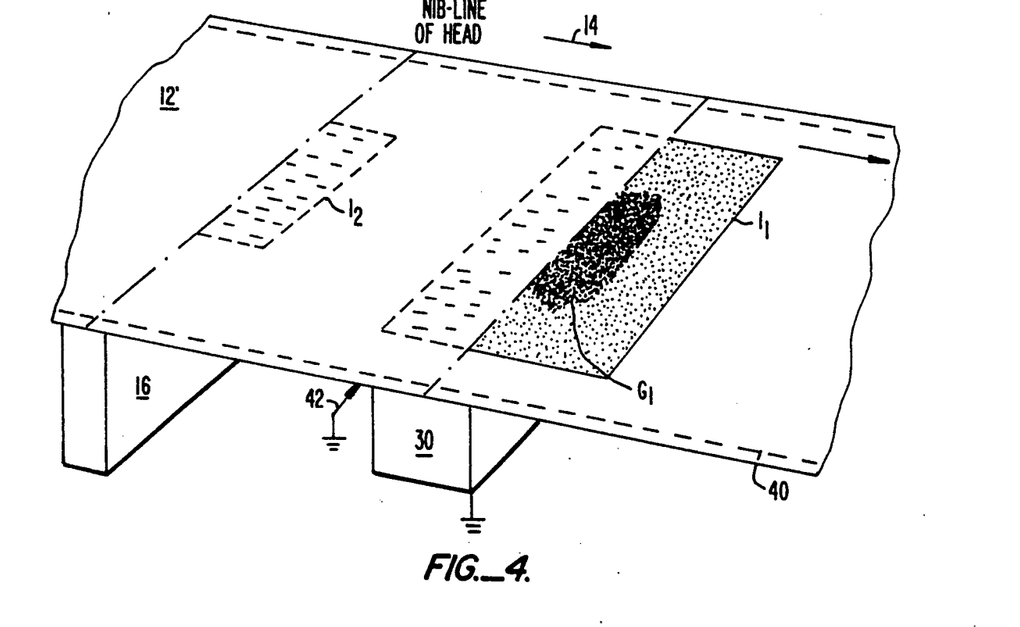
FIG. 4 illustrates fountain image ghosting occurring when film medium 12' is used in plotter 10 to receive the latent electrostatic image.

FIG. 4 illustrates fountain image ghosting occurring when film medium 12' is used in plotter 10 to receive the latent electrostatic image. Fountain ghosting is the consequence of fountain 30 located "downstream" of recording head 16. As a prior recorded first image $I_1$ is being developed at fountain 30, a charge associated with a second image $I_2$ is deposited on film medium 12' by recording head 16. The writing of the latent image $I_2$ establishes an electric potential which extends to fountain 30 to cause a ghost image, $G_1$, to be superimposed or developed at the same time as the first image $I_1$. Generally, ghost image $G_1$ is a lighter image than second image $I_2$ with details less defined. The ghost image $G_1$ is lighter closer to the plot edges. However, the area of overlap of $I_1$ and $G_1$ is darker because of an increased potential over fountain 30.

Figure 5:
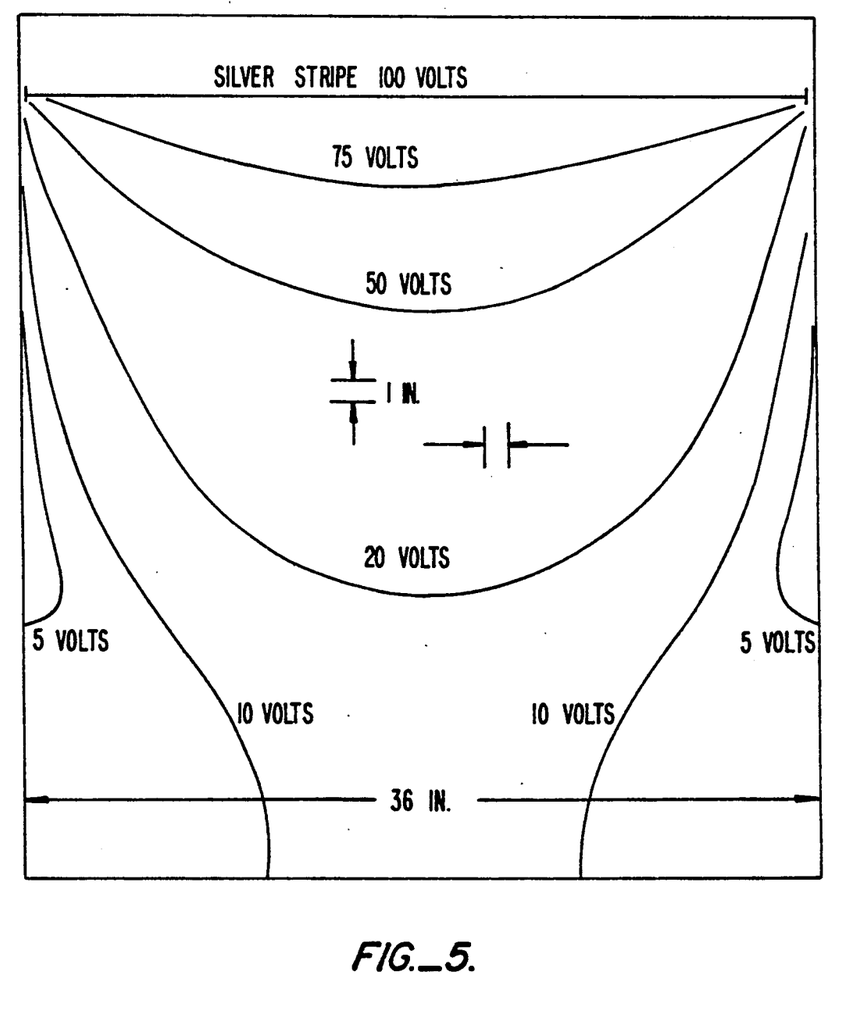
FIG. 5 illustrates an experimental plot depicting equipotential lines established during a simulated recording of data on film medium 12'.

FIG. 5 illustrates an experimental plot depicting equipotential lines established during a simulated recording of data on film medium 12'. The plot was made by establishing a 100 volt potential at a conductive simulation stripe which is electrically connected to conductive layer 102 placed across the film medium 12' (illustrated in FIG. 2). The position of the simulation stripe corresponds to a recording head position. In typical plotters, fountain 30 may be 4–12 inches downstream of recording head 16. FIG. 5 reveals that equipotential lines of significant voltage extend downstream a significant distance. The reader will understand that the pattern of the equipotential lines will not change with varying voltages applied to the conductive simulation stripe, while the magnitudes of particular equipotential lines will vary directly with the applied voltage. This plot is representative of equipotential lines established by charges deposited during recording.

The cause of fountain ghosting is apparent and may be described by reference to FIGS. 2, 4 and 5 as follows. As a particular latent image is deposited by application of negatively charged particles 110 upon dielectric layer 100, corresponding positive charged particles 112 from conductive layer 102 are associated with them, establishing a dipole. As the negative charges 110 on dielectric layer 100 are relatively immobile, and positive charges 112 are "neutralized" thereby, there is an excess of negative charges 114 in conductive layer 102 which are "un-neutralized." It is desired that conductive layer 102 be grounded, therefore edge stripes 40 are provided for film medium 12'. Edge stripes 40 are formed during manufacture by painting a conductive ink which also dissolves a portion of dielectric layer 100 to make contact to the conductive layer 102. Excess un-neutralized negative charges establish an electric potential which drives the un-neutralized charges out to the grounded edge stripes. The established negative potential extends over fountain 30 and therefore the conductive layer attracts positive toner particles in fountain 30 to a underside of film medium 12'. Thus, a ghost image of a currently recorded image is superimposed upon any latent image currently being developed, or the ghost image is developed over an area desired to be undeveloped.

The ghost image is influenced by many factors. As described above, the ghosting potential is directly related to the rate of charging of the dielectric. Thus, the ghosting potential is directly dependent upon plotter speed, data flow, dark-pot setting (writing voltage), and a dielectric constant of the film medium 12'. The ghosting potential is produced as the un-neutralized charges leak along conductive layer 102 to edge-stripe 40 at ground point 42. Therefore, the ghosting potential is also proportional to the sheet resistance (which usually is dependent upon humidity and temperature).

This ghosting potential over the fountain caused by the potential established to drive charge (released by the writing process) to the edge stripes can be simulated or calculated.

An additional concern with ghosting is the phenomenon referred to by ourselves as anti-ghosting. An anti-ghost is the area upstream of a ghost image. As is appreciated, when a ghost image is superimposed upon a recorded image, the area of overlap will appear to be darker, as a larger potential was used to attract positive charges from the fountain. If the ghost image stops (because the writing stops) as the recorded image continues to be developed, an apparent lightening of the image will result because an unmodified "normal" potential is then solely responsible for the intensity of the image. It is the lighter image, without ghost, which is referred to as an anti-ghost.

It is important to note that because the ghosting potential is caused by the potential drop across the media as released charge passes to the edge stripes, that potential is dependent on the plotter geometry and is proportional to the media resistivity and the rate of unneutralized charge release. The charge release rate in turn is proportional to the written image voltage and the "data flow," that is, the rate of 1's being written.

We have sensed the ghosting potential over the fountain with, such as for example, a kelvin probe, and servo-ed the bias voltage to eliminate this ghosting potential at the center of the fountain.

However, we have found it more convenient and less susceptible to extraneous signals to take into account the plotter geometry and media resistivity by a manual potentiometer setting and to vary the bias voltage according to the dark-pot setting of the plotter (writing voltage) and the rate of writing 1's. The rate of writing 1's, of course, depends on the speed of the plotter and percentage of 1's written in comparison to total pixels written.

Figure 7:
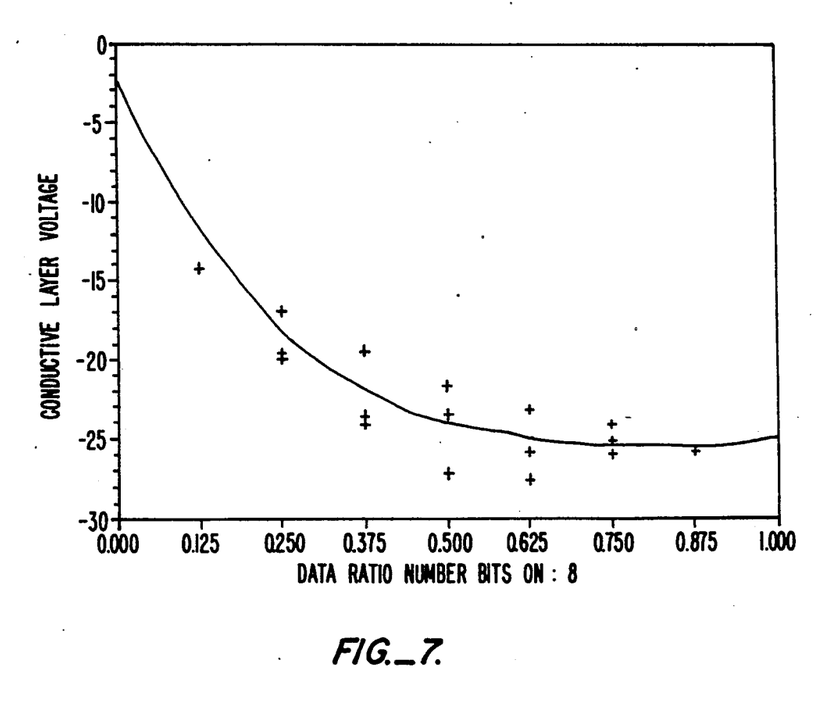
FIG. 7 is a graphical illustration of a plot expressing voltage versus percentage proportion of the number of bits of a byte which have been recorded.

The correct bias is not exactly proportional to the rate of writing 1's, because of pixel overlap. When one pixel is written adjacent to another and "overlaps" that pixel, the overlap region is not written twice. The second pixel merely writes in that region not already written to by the first pixel. Thus, separated pixels will release more free charge than clumped pixels, the ghosting potential will be greater, and therefore the required bias will be greater. Thus, there is a rough non-linearity between the required bias voltage and the rate of writing 1's. This non-linear dependence is shown in FIG. 7.

The reader will appreciate that in use of the standard type of paper medium 12 described previously, fountain ghosting will not occur. The reason for this is described as follows. In FIG. 6, the operation of a plotter 10 recording on paper medium 12 is illustrated. While the latent image is being deposited on the underside of paper 12, there are backplate electrodes 18 contacting the top surface of the paper 102. These backplate electrodes 18 are connected to ground through a plurality of backplate drivers (not shown). Thus, after a nib group writes, the corresponding backplates return to ground and any dis-associated negative charges are immediately swept out of the conductive layer. The sweeping out is efficient as access to conductive layer 102 is possible across the entire width of the paper 12. With film medium 12', capacitive coupling is used to record a charge, and direct access to the conductive layer is only possible along edge stripes 40. Therefore, un-neutralized negative particles must leak to the side edge at selected ground points 42.

Although ghosting is therefore not a problem with writing on paper, there is some prior art in writing on paper.

U.S. Pat. No. 4,290,076 entitled "Compensatory Means Improving The Operation of Electrostatic Printers," issued Sept. 15, 1981 to McFarland illustrates a prior art method used to eliminate a potential difference between a conductive layer of paper recording medium and a fountain. A circuit is provided for sensing the potential immediately upstream from the developing station, and to supply a current to the conductive layer to bring the potential difference to zero and therefore reduce a developer "plating-out" problem. The non-zero potential over the fountain is created by recording with backplate voltages above ground, by triboelectric ("rubbing") charging, and by insufficient grounding of the conductive layer between the backplates and the fountains.

SUMMARY OF THE INVENTION

The present invention provides a method and apparatus for removing a ghost image from a film medium by compensating a ghosting potential. The present invention offers a number of advantages over the prior art. By use of an improved plotter embodying the present invention to record an image on a film medium, ghosting is virtually eliminated or greatly reduced. Thereafter, the plots may be utilized by a customer without unsightly extraneous images or without time consuming manual alteration of individual plots to remove the ghost image.

According to one aspect of the invention, means are provided for estimating, based upon particular plotter dimensional and operative parameters (such as rate of plotter writing) the stripe bias potential needed to eliminate the ghosting potential at the developing station. Finally, means are provided for applying this counteracting bias to the stripes near the recording head which establishes an electric potential counteracting the ghosting potential, thereby virtually eliminating the ghost image.

The invention is particularly desirable because it simply and conveniently eliminates ghosting images when the plotter is used for recording on film. The operation of the present invention may be made transparent to a user.

A further understanding of the nature and advantages of the invention may be realized by reference to the remaining portions of the specification and the attached drawings.

DESCRIPTION OF THE PREFERRED EMBODIMENT

FIG. 1 is a perspective view of an electrographic plotter 10' embodying the present invention and illustrating a preferred embodiment. Items representing common elements as those of the prior art plotter illustrated in FIG. 6 are commonly labeled. A film medium 12' is taken in direction of arrow 14 from a spiral wound roll past recording head 16 and backplate electrodes 18. Film 12' is then taken past developing station 30. Film medium 12' has conductive stripes 40 running along both edges, permitting access to conductive layer 102 shown in FIG. 2. Stripes 40 are grounded near fountain 30 at ground point 42.

A driver circuit 36 is provided to serially pulse each of nibs 20 in response to a digitized image I to be recorded and subsequently developed. It is known in the art to provide a digitized image to a plotter, and details of this process will not be further described herein. To record digitized image I requires cooperation with backplate electrodes 18 to deposit a latent image As described above, the writing of the latent image will establish a ghosting potential of a particular magnitude over fountain 30. The actual magnitude is dependent upon many factors, including sheet resistance, humidity, writing voltage, plotter speed and dimensions, and data flow. Except for data flow and plotter speed, these parameters are virtually constant for a particular plotter and a particular film roll. Thus, a constant of proportionality may be established both for ghosting potential as it is related to data flow and plotter speed.

To remove the ghost image, the preferred embodiment is to establish a counteracting potential in conductive layer 102 over fountain 30. A counteracting voltage is applied to recording medium 12' relatively close to recording head 16, within a few inches, via a set of contact arms 60. Contact arms 60, in the preferred embodiment, are each comprised of a plurality of levers which pivot and are counter balanced to maintain electrical communication between a ghost elimination circuit 50 and stripes 40.

Figure 3:
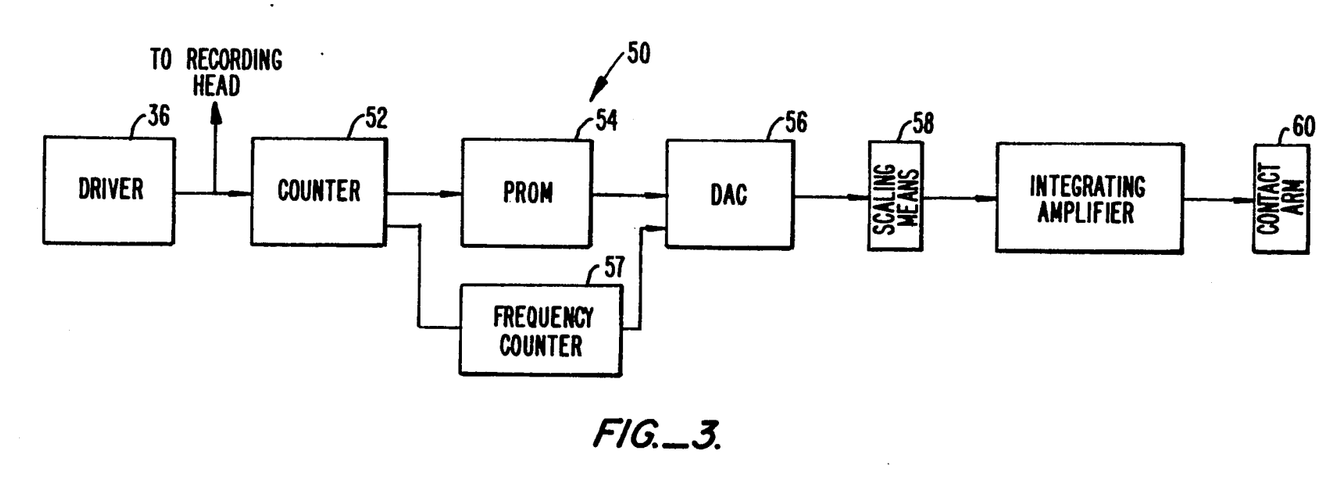
FIG. 3 illustrates in schematic fashion, a block diagram for ghost elimination circuit 50.

Ghost elimination circuit 50 is coupled between driver circuit 36 and contact arms 60. FIG. 3 illustrates in schematic fashion, a block diagram for ghost elimination circuit 50. As the ghosting potential established during recording is directly related to data flow, a counter 52 is coupled to driver circuit 36 to establish the number of nibs 20 which are to be pulsed for recording image I. Generally, the more nibs 20 which are to be pulsed, the greater will be the ghosting potential established thereby As previously explained, this is a non-linear relationship.

The charge deposited is a function of the number of 1's which are written, and to a lesser extent, of the order in which they are written. There may be some variation in the electric potential fields established by positioning charges on a single scan line. However, it has been observed that first order approximations are generally satisfactory. These first order approximations take into account only the amount of charge deposited on the medium per scan per time interval, and not directly the spatial pattern of the deposited charges.

Counter 52 is provided to count the number of 1's to be written in a group. This count is related to the bias voltage to be induced in conductive layer 102 near recording head 16. The bias voltage used to counteract the ghosting potential over fountain 30 is shown in the plot of FIG. 7. This count is communicated to a PROM which has a stored look-up table 54. The data stored is similar to the data of FIG. 7 and is used to permit the non-linear relationship between data flow and bias voltage to be expressed. Thus, the look-up table extracts a predetermined value representative of the charge deposited by a recorded group of data. The value stored is dependent upon plotter 10' characteristics.

This predetermined value is in turn communicated to an input of a digital-to-analog convertor ("DAC") 56. DAC 56 outputs a voltage through a buffer to convert the current-type device of DAC 56 to a driving voltage. The output of the driver is coupled to contact arms 60 to establish an equalizing potential field near recording head 16. This counteracting potential counteracts the ghosting potential at the fountain. It is preferred that the equalizing potential be established near recording head 16.

As an additional preferred embodiment, a frequency counter 57 is provided as a part of circuit 50. Counter 52 outputs a pulse each time a nib group is written. Frequency counter 57 converts this count to a voltage proportional to an established voltage. The established voltage is determined for full speed operation of the plotter. As the deposited charge is directly and linearly related to plotter speed, if half speed operation is used, one-half the maximum reference is supplied by frequency counter 57 to DAC 56. It is this voltage which may be used as the reference voltage for DAC 56. In operational terms, DAC 56 functions as a multiplier, based upon the input digital value and the value of the reference voltage. That is, if the percentage number of 1's which are being recorded remains constant, but the rate at which the charges are being recorded varies, the required bias voltage will vary as well. Thus, the reference voltage input into DAC 56 is controlled by the rate of recording data (plotter speed) and the multiplying effect of DAC 56 is reflected in the output voltage.

As still another preferred embodiment, the desired output of DAC 56 may be further controlled and adjusted by a manual scaling means (potentiometer) 58 before being buffered and filtered and communicated to the contact arms 60. The potentiometer 58 may be provided for manual adjustment by an operator to compensate for film medium 12' variations, such as temperature, humidity, or other sheet resistance variation. It has been observed, that adjustment of the potentiometer is seldom required.

In operation, as image I is being deposited on film medium 12', counter 52 counts the number of 1's recorded per group of pulses. At the same time, as a group is recorded, a rate pulse is output from counter 52. The number of 1's counted is input as an address into PROM 54 which serves to look up the voltage associated with the particular count received. This digital voltage is input to DAC 56 to output a voltage, referenced against a scaled reference voltage. The reference voltage is scaled by use of frequency converter 57. The rate pulses are input into frequency convertor 57 which will scale the reference voltage proportional to the speed of recording the data. The scaled output voltage from DAC 56 is buffered and then adjusted by a user adjustable potentiometer 58. Potentiometer 58 permits variables independent of charge deposition to be compensated. The desired output voltage is then driven onto contact arms 60 which are electrically communicated to conductive layer 102 near recording head 16. This desired voltage establishes a counter potential to the ghosting potential over fountain 30, effectively eliminating ghosting during the recording of an image on film medium 12'.

A further, less preferred embodiment is the maintenance of a constant DC bias of stripes 40 near recording head 16. This constant DC bias does reduce ghosting potential over fountain 30 when the recorded charge approximates the potential established by the constant DC bias. Thus, a predetermined and adjustable value for the DC bias could be established as some average value for an average scan.

The constant DC bias method has the drawback that it does not eliminate "anti-ghosting" because the bias needs to be removed as soon as writing ceases. Also there is the drawback that as the recorded charge varies from the average amount, more or less ghosting or background will occur. That is, if the DC bias undercompensates, then a ghost image will begin to appear. As the DC bias overcompensates, there may be a problem of "plating-out" occurring where toner is deposited on fountain 30. This deposited toner then builds up until the overlying medium contacts it and is subsequently scraped off causing a general plot background stain. The constant DC bias method is generally viewed as acceptable for line drawings when substantial fill areas are not anticipated (low percent of 1's written), and when plotter speed is reduced.

It has also been demonstrated that stripes 40 may be maintained at ground, and fountain 30 biased negatively, equivalent to the ghosting potential. This method has two disadvantages. The first is that if the fountain is biased negatively, the conductive layer, because of contact to the fountain through the edge stripes, will also be biased negatively. Because of this, a lightening of the recorded image will occur. Second, as a safety consideration, it is not advisable to apply a voltage at the fountain. Operators generally pick-up and observe plots as they are being developed. The risk of shock is increased. Therefore, the desirability of this solution is not great. The same is true for applying a constant DC bias to the fountain and grounding stripes 40.

Additionally, second order approximations may be compensated by increasing the complexity and the expense such as by use of a microprocessor. It has been observed that the natural averaging performed by the above described circuit is generally acceptable for the majority of applications.

In its general application, a function which is to be implemented by a ghost removing system is of a form:

$$\text{Volts} = K * \text{Velocity}_{Media} * f(\text{Pixel Count})$$

$$* f(\text{Darkpot}) * f(\text{User Correction})$$

where
$K$ is a constant having a value as yet undetermined;
$\text{Velocity}_{Media}$ is a scale value of a print media velocity;
$f(\text{Pixel Count})$ is a non-linear value based on pixels plotted/scan;
$f(\text{Darkpot})$ is an as yet undefined value based on a darkpot setting; and
$f(\text{User Correction})$ is an operator access menu which replaces a potentiometer.

The general function described above may be implemented by the use of a microprocessor used to control a plotter embodying an embodiment of the present invention. Such a microprocessor may have available to it all of the above parameters. This is partly because the microprocessor may be used to control the particular parameters directly, such as $\text{Velocity}_{Media}$ commanded by the microprocessor or $f(\text{User Correction})$. In those instances wherein the microprocessor is used and has these parameters available, the microprocessor could perform the necessary computations and an appropriate word could be written via an external bus to a DAC located on a driver board, for example. The DAC would output a voltage which could be appropriately scaled, for example up to a maximum voltage of 40 volts DC. This scaled voltage could be applied to a film stripe adjacent a print head.

It is possible to implement the above-described general formulae without use of all the parameters to a very good level of approximation. Without determination of $K$ and $f(\text{Darkpot})$, successful ghost elimination may be obtained.

While the above provides a full and complete description of a preferred embodiment of the present invention, various changes and modifications may occur to those of ordinary skill in the art, given the benefit of the present disclosure. Therefore, it is the appended claims which define the scope of the present invention, which is not to be construed to be limited to the specific embodiments set out herein.

What is claimed is:

1. An apparatus for reducing a ghosting potential-difference established between a portion of a film medium and a developing station, wherein the potential difference is established as a result of a plurality of un-neutralized electrically charged particles induced in a conductive layer laminated between two dielectric layers in response to charged particles deposited on the film medium by a recording head in response to data received from a driver circuit, comprising:

a counting circuit, coupled to the driving circuit, for determining a number of write pulses transmitted to the recording head in a particular data set;

a look-up table, coupled to said counting circuit and responsive to said number of write pulses, to supply a signal representative of a total charge deposited by said recording head in response to said particular data set;

a digital-to-analog convertor, coupled to said look-up table and responsive to said count signal, to output a biasing voltage related to said total deposited charge; and means, coupled to said digital-to-analog convertor, for inducing an equalizing potential change in response to said biasing voltage which reduces the ghosting potential difference between the film medium and the developing station.

2. An apparatus for reducing a ghosting potential difference established between a laminate film having a conductive layer between two dielectric layers and a developing station as a result of an electrical charge deposited on one of the dielectric layers, comprising:

means for estimating an amount of current induced in the conductive layer proximate a recording head as a consequence of depositing the electrical charge;

means, coupled to said estimating means, for approximating a magnitude of an induced potential established by the induced current;

means, coupled to said approximating means, for supplying a voltage proportional to said induced potential; and means, coupled to said voltage supplying means, for inducing a potential change in said conductive layer counteracting the ghosting potential difference.

3. An improved electrographic plotter for depositing a plurality of electrically charged areas in response to a series of write pulses upon a dielectric surface of a film laminate having a conductive layer sandwiched between two dielectric layers, the deposited charges inducing a ghosting potential difference between a developing station and the film laminate proximate the developing station, comprising:

a counter circuit having an input to receive the write pulses, a first output representative of a number of write pulses received, and a second output representative of a write rate;

a PROM, coupled to said counter circuit, storing a plurality of values representative of desired voltages corresponding to a particular number of write pulses, said PROM providing a particular representative value in response to said number of write pulses;

a frequency counter, coupled to said counter circuit, for receipt of said plotter speed, said frequency counter providing a reference voltage scaled in response to said write rate;

a DAC, coupled to said PROM and to said frequency counter, said DAC converting said particular representative value to an analog voltage, said analog voltage scaled by said reference voltage provided by said frequency counter;

a manual scaling means, coupled to said DAC, for permitting an operator to adjust said scaled analog voltage for film laminate variations;

an integrating amplifier, coupled to said manual scaling means, for providing a time averaged adjusted scaled analog voltage; and a biasing means, coupled to said integrating amplifier, for coupling said analog voltage to the conductive layer, said coupling proximate the recording head to produce a counter acting electric field proximate the developing station to reduce the ghosting potential difference.

4. A method for reducing a ghosting potential difference established between a laminate film having a conductive layer between two dielectric layers and a developing station as a result of an electrical charge deposited on one of the dielectric layers, comprising the steps of:

estimating a current induced in a conductive layer of a film laminate overlying the developing station, said film laminate having said conductive layer interposed between a first and a second dielectric layer as a result of the deposited electrical charge;

approximating a magnitude of an induced potential established by the induced current;

supplying a counteracting voltage proportional to said induced potential; and inducing an electric field in said conductive layer by use of said counteracting voltage to counteract the ghosting potential difference.

5. A method for reducing a ghosting potential difference established between a laminate film having a conductive layer between two dielectric layers and a developing station as a result of an electrical charge deposited on one of the dielectric layers, comprising the steps of:

estimating a voltage induced in a conductive layer of a film laminate having said conductive layer interposed between a first and a second dielectric layer as a result of the deposited electrical charge; and applying a counter voltage, responsive to said estimated voltage, to said conductive layer per a predetermined relationship between said induced charge and said counter potential, wherein the ghosting potential difference is decreased by said application of said counter voltage.

6. A method for reducing a ghosting potential difference established between a laminate film having a conductive layer between two dielectric layers and a developing station as a result of an electrical charge deposited on one of the dielectric layers, comprising the step of:

communicating electrically a direct current bias, produced from a direct current source, to a conductive layer between a first and a second dielectric layer of a laminate film to generate a potential difference between said conductive layer of the laminate film and the developing station in opposition to the ghosting potential.

7. An apparatus for reducing a potential difference between a conductive layer interposed between two dielectric layers and a developing station developed in response to a charge deposited on one of the dielectric layers by a deposit device, comprising:

means for approximating the potential difference between a conductive layer interposed between a first and a second dielectric layer of a film laminate and the developing station; and means, coupled to said approximating means and responsive to said approximated potential, for counteracting said potential difference.

8. The reducing apparatus of claim 7 wherein said approximating means includes means for determining a product of parameter values representative of said approximated potential difference.

9. The reducing apparatus of claim 8 wherein said parameter values includes a print media velocity scale value and a non-linear pixels plotted per scan value.

10. The reducing apparatus of claim 9 wherein said counteracting means includes means for providing a voltage to said interposed conductive layer.

11. The reducing apparatus of claim 10 wherein said voltage is provided to said interposed conductive layer proximate to the deposit device.

12. The reducing apparatus of claim 10 wherein said voltage is provided to said interposed conductive layer proximate to the developing station.

13. The reducing apparatus of claim 10 wherein said voltage is provided to said developing station.

14. The reducing apparatus of claim 10 wherein said voltage is a DC voltage.

15. The reducing apparatus of claim 11 wherein said voltage is a DC voltage.

16. The reducing apparatus of claim 12 wherein said voltage is a DC voltage.

17. The reducing apparatus of claim 13 wherein said voltage is a DC voltage.

18. The reducing apparatus of claim 7 wherein said approximating means includes means for measuring the potential difference proximate the developing station.

19. An apparatus for reducing a potential difference between a conductive layer interposed between two dielectric layers and a developing station resulting from a charge deposited on one of the dielectric layers by a deposit device, comprising:

means for approximating the potential difference between the interposed conductive layer and the developing station; and means, coupled to said approximating means and responsive to said approximated potential, for counteracting said potential difference by determining a product of parameter values representative of said approximated potential difference.

20. An apparatus for reducing a ghosting potential in an electrographic plotter, comprising:

means, responsive to a data flow rate to a recording head of the plotter, for determining a magnitude for a ghosting potential developed in a conductive layer overlying a developing station of the plotter during deposition of a plurality of charges at said recording head; and means, coupled to said determining means and responsive to said ghosting potential magnitude, for generating a potential in said conductive layer overlying said developing station to oppose said ghosting potential.

21. A method for reducing a ghosting potential difference established between a laminate film having a conductive layer between two dielectric layers and a developing station resulting from an electrical charge deposited on one of the dielectric layers, comprising the steps of:

sensing a potential difference between a conductive layer of a laminate film and a developing station; and servoing a potential communicated to the conductive layer in response to the sensed potential difference to reduce the potential difference between the conductive layer and the developing station.

* * * * *